United States Patent
Miller

(10) Patent No.: US 10,124,235 B2
(45) Date of Patent: Nov. 13, 2018

(54) ATHLETIC TRAINING METHOD AND SYSTEM FOR REMOTE VIDEO PLAYBACK

(71) Applicant: Karhu Media, LLC, Steamboat, CO (US)

(72) Inventor: Daniel Miller, Steamboat, CO (US)

(73) Assignee: Karhu Media, LLC, Steamboat Springs, CO (US)

( * ) Notice: Subject to any disclaimer, the term of this patent is extended or adjusted under 35 U.S.C. 154(b) by 0 days.

(21) Appl. No.: 15/639,982

(22) Filed: Jun. 30, 2017

(65) Prior Publication Data

US 2018/0071610 A1 Mar. 15, 2018

Related U.S. Application Data

(60) Provisional application No. 62/394,812, filed on Sep. 15, 2016.

(51) Int. Cl.
*A63B 69/18* (2006.01)
*A63B 71/06* (2006.01)
(Continued)

(52) U.S. Cl.
CPC .......... *A63B 71/0622* (2013.01); *A63B 69/18* (2013.01); *G09B 5/06* (2013.01); *G09B 5/065* (2013.01); *G09B 19/0038* (2013.01); *H04N 5/77* (2013.01); *H04N 5/9205* (2013.01); *H04N 7/181* (2013.01); *H04N 9/8715* (2013.01); *H04N 21/23424* (2013.01); *H04N 21/4312* (2013.01); *H04N 21/43637* (2013.01); *H04N 21/47217* (2013.01); *H04N 21/812* (2013.01); *H04N 21/8106* (2013.01); *H04N 21/8126* (2013.01); *A63B 2069/185* (2013.01); *A63B 2220/806* (2013.01); *A63B 2225/50* (2013.01); *G06F 3/04886* (2013.01); *G06F 2203/04803* (2013.01)

(58) Field of Classification Search
None
See application file for complete search history.

(56) References Cited

U.S. PATENT DOCUMENTS

| | | |
|---|---|---|
| 2012/0316798 A1 | 12/2012 | Vock et al. |
| 2015/0265902 A1 | 9/2015 | Riley et al. |
| 2017/0094016 A1 * | 3/2017 | Chen .................... H04L 67/325 |
| 2017/0144024 A1 * | 5/2017 | Warners ................. H04L 65/40 |

OTHER PUBLICATIONS

Insightreplay.com, Reveal Instant Replay System, Instant Replay for Athletes and Coaches, http://insightreplay.com/instant-replay-for-athletes-and-coaches/, Insight Replay, Inc., Hanover, NH.
(Continued)

*Primary Examiner* — Eileen M Adams
(74) *Attorney, Agent, or Firm* — Marsh Fischmann & Breyfogle LLP; Jeremy J. Neilson

(57) ABSTRACT

A system or method for displaying a video segment recorded by a camera device on a display device disposed remotely from the camera device. Video segments may be transmitted over a network to a remote viewing location. Video segments sent from a plurality of camera devices may be compiled by a server and displayed on a single display device. Video segments may auto-scroll such that a user need not interact with this display device to begin playback of a video segment. The technology may be used for such purposes as an athlete reviewing videos captured by one or more coaches or spectators.

13 Claims, 12 Drawing Sheets

(51) Int. Cl.
  *G09B 5/06*  (2006.01)
  *G09B 19/00*  (2006.01)
  *H04N 5/77*  (2006.01)
  *H04N 7/18*  (2006.01)
  *H04N 5/92*  (2006.01)
  *H04N 9/87*  (2006.01)
  *H04N 21/472*  (2011.01)
  *H04N 21/81*  (2011.01)
  *H04N 21/4363*  (2011.01)
  *H04N 21/234*  (2011.01)
  *H04N 21/431*  (2011.01)
  *G06F 3/0488*  (2013.01)

(56) References Cited

OTHER PUBLICATIONS

Clarke, Graham, Ski Jumping With Immediate Video Feedback: Reveal on the K90 With Team USA, http://insightreplay.com/immediate-video-feedback-reveal-jumping-the-k90-with-team-usa, Nov. 20, 2013, Insight Replay, Inc., Hanover, NH.

Skiracing.com, Ski Coaches Go High Tech, http://www.skiracing.com/stories/ski-coaches-go-high-tech, Mar. 12, 2005, Ski Racing Media Inc., United States.

Hudl.com, Hudl Technique, Improve in Slow Motion, https://www.hudl.com/products/technique, Agile Sports Technologies, Inc. d/b/a Hudl, Lincoln, NE.

* cited by examiner

US 10,124,235 B2

ATHLETIC TRAINING METHOD AND SYSTEM FOR REMOTE VIDEO PLAYBACK

RELATED U.S. APPLICATION DATA

This application claims the benefit of U.S. Provisional Application No. 62/394,812, filed on Sep. 15, 2016, the entire contents of which are incorporated herein by reference.

FIELD OF THE INVENTION

The present invention relates generally to the recording of a video segment and playback on a remote display. The invention enables a user to observe multiple video segments on a single display device in a location which is more convenient for observation than the location(s) of the camera device(s).

BACKGROUND

Many mobile electronic devices (e.g., mobile phones, tablet computers, laptops) include a built-in camera. These cameras, in combination with microphones in the mobile electronic devices, are capable of capturing still images as well as video and associated audio. Although the term video will be used throughout this document, it should be appreciated that "video," "video footage," "video feeds," "video imagery," etc. may be used interchangeably and may refer to video, still photographs, audio or any combination thereof.

The devices generally store the captured video on an internal storage device. Frequently, the video is replayed on the device's integrated display. In some instances, the video may be sent from the device via text message or email so that others may view the video at a later time or at a remote location.

Athletes are seeking methods and tools that may enable them to refine their techniques and thereby improve their performance. For instance, ski jumpers may wish to observe jumps they have completed during training or competition so that they may ascertain the characteristics of their attempts in an effort to eliminate poor traits and incorporate beneficial techniques.

Often, the ideal location for obtaining a valuable perspective of a ski jump is up on the slope in the vicinity of where the jumper launches. While it's possible to record a jump from a camera located at a relatively high elevation on the slope, it's inconvenient and impractical for a skier to ascend the hill to such a location to then view the video. The ideal location for observation of the video is at a lower elevation near the base of the slope such that the skier may observe the video immediately upon completion of the jump.

SUMMARY OF THE INVENTION

Although some existing technologies allow for recording and playback of video, these have certain characteristics that are undesirable, especially in the context of athletic training and other applications where remote playback may be desired. For instance, a live video feed is often impractical for use by a ski jumper or other athlete due to the focus required on their respective performance and the distraction that would result from simultaneous observation of a video feed. Certain solutions may exist in which the athlete's performance may be recorded and recalled at a later time for observation, but this usually requires the video to be played on the same device on which it is recorded or, alternatively, transferred to another device in an inconvenient or time consuming manner such as sending an email, which results in delays, or sending a text message which significantly reduces the video quality or requires an excessive amount of time. Additionally, existing solutions require the athlete to interact with the display device in order to initiate playback which is impractical for many athletes. For instance, a ski jumper may be wearing protective gear (e.g., gloves) to protect his or her appendages from the cold air or snow and such gear often hinders the dexterity required to interact with electronic devices. Moreover, the gear may be incompatible with touchscreen devices. The delay and effort associated with removing one or more layers of protective gear to enable interaction with a display device is detrimental to efficient use of limited practice or competition time, not to mention the exposure to the elements resulting from removal of the gear. Alternatively, a second user may be present at the location of the display device to initiate playback but this has the implications of needlessly occupying the limited availability of a peer or coach, preventing them from making more efficient use of their time such as training or teaching, respectively.

Additionally, existing methods may transmit video from a specific camera to a specific display device (e.g., conventional video camera wired to a display monitor). However, there may be times at which it is desirable cease transmitting video from the camera to one display device and begin transmitting video from that camera to another display device without expending time to reconfigure any hardware or wiring. Moreover, there may be scenarios in which an athlete wishes to view multiple previous attempts side by side on a single display device for comparison.

The present invention is directed to automatically displaying videos, recorded on one electronic device, on another electronic device. In some instances multiple videos sourced from multiple devices may be displayed simultaneously or consecutively on a single device. In other instances, multiple videos sourced from a single device may be displayed simultaneously or consecutively on a single device.

In one aspect of the present invention, functionality is executed on a camera device. A camera device may be any apparatus capable of recording and transmitting video. In many instances, a camera device may be a mobile electronic device such as a mobile phone, a tablet computer, etc. A camera device may or may not include an antenna capable of communication with a network. Logic may be resident on the device itself (e.g., in computer readable memory) or may be accessed online through a web browser or other means of accessing online content. The logic may be functional to operate the camera during the recording of a video segment (e.g., the logic includes computer readable instructions for operating the camera) or the logic may receive the video segment after it has been recorded. In this regard, native camera software or another application may operate the camera during recording and save the video onto the device at which point the video may be retrieved by an application of the present invention. In either manner, the video segment may be tagged by the logic/camera device with an identification code that may be transmitted with the video segment. The identification code may be associated with a particular display device. The identification code may be selected or input by the user in any manner, allowing the user to select a desired display device to which the video segment may be routed as a function of the identification code.

In one embodiment, the identification code may be an alphanumeric sequence that a user types into the application. In such an instance, the user may input the identification code into a settings menu within the application. In another instance, the identification code may be entered by the user's selection of a description of the display device (e.g., New York City—Stadium XYZ—Monitor 1) that appears in a list on the user's camera device. The list may be auto-populated as a function of the geographic location of the mobile electronic device. Alternatively, the user may navigate through a series of filters within the application to narrow down a comprehensive list of selectable display devices (e.g., select a state, select a city, etc.). The identification code may also be communicated as a bar code, an RFID tag, or any other appropriate manner of identifying a particular display device. In this regard, a user may scan an image with a camera device, allowing the application to automatically select the associated identification code. Once the identification code has been selected, video segments transmitted from the camera device will be tagged for routing to the associated display device.

In another embodiment a camera device may identify and subsequently associate with a particular display device as a function of proximity. For instance, a server or display device running the application, or any device in communication therewith, may transmit a signal (e.g., Bluetooth™ or WiFi™). As a function of receiving such signal, a camera device may associate with a display device automatically or as a result of a user granting permission. Additionally, a user may link to a display device as a function of connecting to a wireless network to which the display device is also connected (e.g., LAN).

In another embodiment, a camera device is operable to select a display device as a function of geolocation. For instance, the camera device may comprise a GPS receiver which enables the device to ascertain its location. As a function of the location, the application may automatically pair a camera device with a display device associated with a location. To illustrate, a spectator may attend a ski jumping event at a particular ski resort. The spectator's mobile phone (i.e., camera device) equipped with the application may utilize the mobile phone's GPS functionality to determine that the mobile phone is located at that particular ski resort. As a function of the location, the application may reference a lookup table to ascertain that the nearest display device is a scoreboard, JumboTron™, or similar device located at the particular ski resort. As a function of identifying the mobile phone's location and its proximity to the display device, the application may select the display device and associate the camera device therewith. As a result, video segments recorded by the mobile phone may be transmitted to the display device, directly or via a server.

In another aspect of the present invention, functionality is executed on a display device. A display device may be any system capable of receiving video, directly or through a network, and exhibiting it on a display screen (e.g., LCD, LED, CRT, projector, etc.). For example, a display device may be a television, a mobile phone, a tablet computer, or a stadium scoreboard. A display device may be a smart display capable of storing and running applications. In this regard, an application operating on a display device may receive video from a camera device. As a function of receiving the video, the application may display the video or load the video into a display queue to be played in sequence with other videos. The video may be displayed independently or in conjunction with other videos sent from the same camera device or from other camera devices.

In yet another aspect of the present invention, functionality is executed on a server. This may be desired when a display device lacks the smart functionality required to run an application. In this regard, logic executed on a server may perform some or all of the functions described herein related to a display device. For example, a server application may place a received video into a queue or it may also combine the video into a composite video feed with other received videos. In this manner, the server may generate a video signal that is transmitted to a display device for exhibition.

In an embodiment of the present invention, it may be desired for multiple video segments to be displayed on a display device. Video segments may be displayed sequentially or simultaneously. In either instance, video segments may be queued to auto-scroll such that they are immediately observable without interaction by a user at the display device. In this regard, upon a new video segment being received, the new video segment begins to stream. If another video segment is being displayed, it may either be removed from the display screen entirely or repositioned to an alternate subscreen (e.g., a subset of the area available on the display screen). For example, when a new video segment is received, it may begin streaming (one single time or in a repeating loop) on a primary subscreen (e.g., a large portion of the display screen). At substantially the same time, a video segment that was previously streaming on the primary subscreen may begin streaming on a secondary subscreen (e.g., a relatively small portion of the display screen).

It is also contemplated that video segments may be configured to display on a display device following an intentional delay. In one example, there may be a preset delay period that begins either when recording of the video ceases or when the video is received at the server or display device. The preset delay period may be of a length corresponding to an anticipated delay in a user reaching the display device. For example, an average length of time elapsing between a skier landing a jump and the same skier reaching the bottom of the slope may be 30 seconds. In turn, a user may set the preset delay period to 30 seconds. In this regard, the video segment will not be displayed until 30 seconds after a coach ceases recording (at the time the jump is landed) such that the skier may traverse the remainder of the slope and approach a display device at substantially the same time that the preset delay period expires and the video segment begins playing on the display device. A preset display period may be pre-programmed into the application or may be configurable such that a user may select or input any desired length of time.

Additionally, a display device or other hardware associated therewith may be operable to detect a user and begin playback of a video segment in response thereto. This functionality may be establish in any appropriate manner. For example, an RFID scanner may detect an RFID tag carried by or otherwise associated with a user. In this regard, as the user approaches the display device, the RFID tag may be detected and/or identified and a video segment associated with a user corresponding to the RFID tag may begin playing on the display device. In another example, a user may be associated with an electronic device (e.g., cellular phone) which has GPS location functionality. When such an electronic device determines that its position (and therefore, the user's position) is within a certain proximity of a display device, the electronic device or a server associated therewith may transmit an instruction for the display device to begin playback of a video segment. In yet another example, a camera integrated into or associated with a display device may be used to detect that a user is approaching the display device. In this regard, when motion associated with a user is detected by the camera, video playback may begin. Such motion may be any motion at all, such that playback begins anytime motion is detected, or such motion to begin playback may be configured to correspond with a substantial degree of motion such that false indicators (e.g., wildlife, leaves or trash blowing in wind, etc.) do not prematurely initiate playback. Furthermore, functionality associated with the camera may require certain movement of a user in order to initiate playback. For example, a gesture such as a wave of an arm or certain hand signal may be required to begin playback.

Whether playback of a video segment begins immediately upon receipt, after a preset delay period, or upon a user being detected at the display device, it is to be appreciated that video playback may be initiated without any physical interaction of a user with the display device. That is to say, a user may view a video segment without needing to physically touch the display (e.g., touchscreen) or any hardware associated therewith (e.g., mouse, play button, etc.). This may be particularly relevant in the context of users wearing protective gear (e.g., gloves), users relatively distant from a display device (e.g., a JumboTron™ display mounted at an elevated position above a crowd and out of a user's reach), or users in a vehicle who may desire to remain within the vehicle (e.g., a race car driver).

It should be appreciated that the present invention may allow a user to quickly reconfigure a camera device to stop transmitting video segments to a first display device and instead transmit video segments to a second display device. Such reconfiguration may be accomplished, for example, by simply inputting or selecting an alternate identification code which is associated with another display device. This may be advantageous, for example, for a coach wishing to, using a single camera device, record a first video and transmit the first video to a display device near a first athlete and subsequently record a second video and transmit the second video to a second display device near a second athlete. Such a scenario may arise when a coach is located between adjacent ski jumps and it is inconvenient or impractical for a single display device to be utilized at the base of the slope but rather it is preferred to locate a first display device near a first ski jump landing and a second display device near a second ski jump landing.

One may appreciate that there may be a single version of the application which is operable on a camera device, a server or a display device. Alternatively, there may be a camera device version of the application that is functional on a camera device, a server version of the application that is functional on a server, and also a display device version of the application that is functional on a display device. In any regard, the single or various applications may be operable to perform the functions described herein independently or in conjunction with one another.

It should also be appreciated that display devices utilizing the present invention may be operated in public mode or private mode. An administrator of a display device may toggle a setting to convert the display device from public mode to private mode and vice versa. In public mode, any camera device user may be able to associate the camera device with the display device and transmit video segments thereto. This mode may be applicable to sporting events, for instance, such that audience members may submit their videos for display to the entire crowd or viewers at a remote location. Alternatively, private mode may be desired to limit accessibility to the display device. This may be preferred during athletic training when multiple athletes and multiple coaches are utilizing a shared facility and a coach desires that only the video segments of his or her athletes appear on a particular display device to prevent observation by opponents.

Security settings may be incorporated into an embodiment of the present invention to allow access only to authorized users. For example, a password may be set by an operator of a display device. In this regard, users of camera devices may be required to input such password in order to transmit videos to the display device or a server associated therewith. Moreover, a user may be required to input a password at a display device in order to initiate video playback. In this regard, there may be privacy concerns regarding viewing of a video segment such that a user of a camera device may password protect a video segment to require each viewing user to input the password to initiate playback. Additionally, users may be required to input a password or access code in order to download or install an embodiment of the present invention onto a camera device, a display device, or a server device.

Notably, filtering policies may be implemented regarding a display device. As one example, at a sporting event, video segments transmitted from camera devices operated by spectators may be transmitted to a control station at which an operator may preview the video segments and selectively route chosen video segments to a display device while rejecting other video segments, thus preventing them from exhibition on the display device. This may be preferred to filter out irrelevant or low quality video segments. As another example, filtering may be processed automatically by the application. For instance, videos with a duration exceeding a specified maximum may be prevented from transmission to the display device or may be automatically edited. Video content may also be automatically screened by any known method of video analysis.

In an embodiment, a commercial video segment may be displayed comprising a commercial advertisement. A commercial video segment may be displayed on a subscreen of a display while another video segment is displayed on another subscreen of the display device. A commercial video segment may be comprised of products which are deemed desirable by spectators present at a particular sporting, or other, event. In this manner, spectators' attention may be drawn to the display device by video segments which have been sourced from one or more camera devices located in the vicinity of the display device. Subsequently or simultaneously, a commercial video segment may be displayed on the entire area of the display screen or on a subscreen.

In an embodiment of the present invention, a user may provide commentary to accompany a video segment. Commentary may be in the form of a drawing (e.g., stylus used to mark on a touchscreen), textual comments, or verbal feedback. In this regard, a user of a camera device may add commentary to a video segment prior to transmitting to a display device. The commentary may be transmitted over a network with the video segment and identification code. As a video is exhibited on a display device, commentary may also be exhibited. As an example, a coach might circle a problematic technique during video playback or may make verbal comment in real-time while recording. Thus, when an athlete reviews the video, the commentary may be readily available to the athlete with the video.

DETAILED DESCRIPTION

Figure 1:
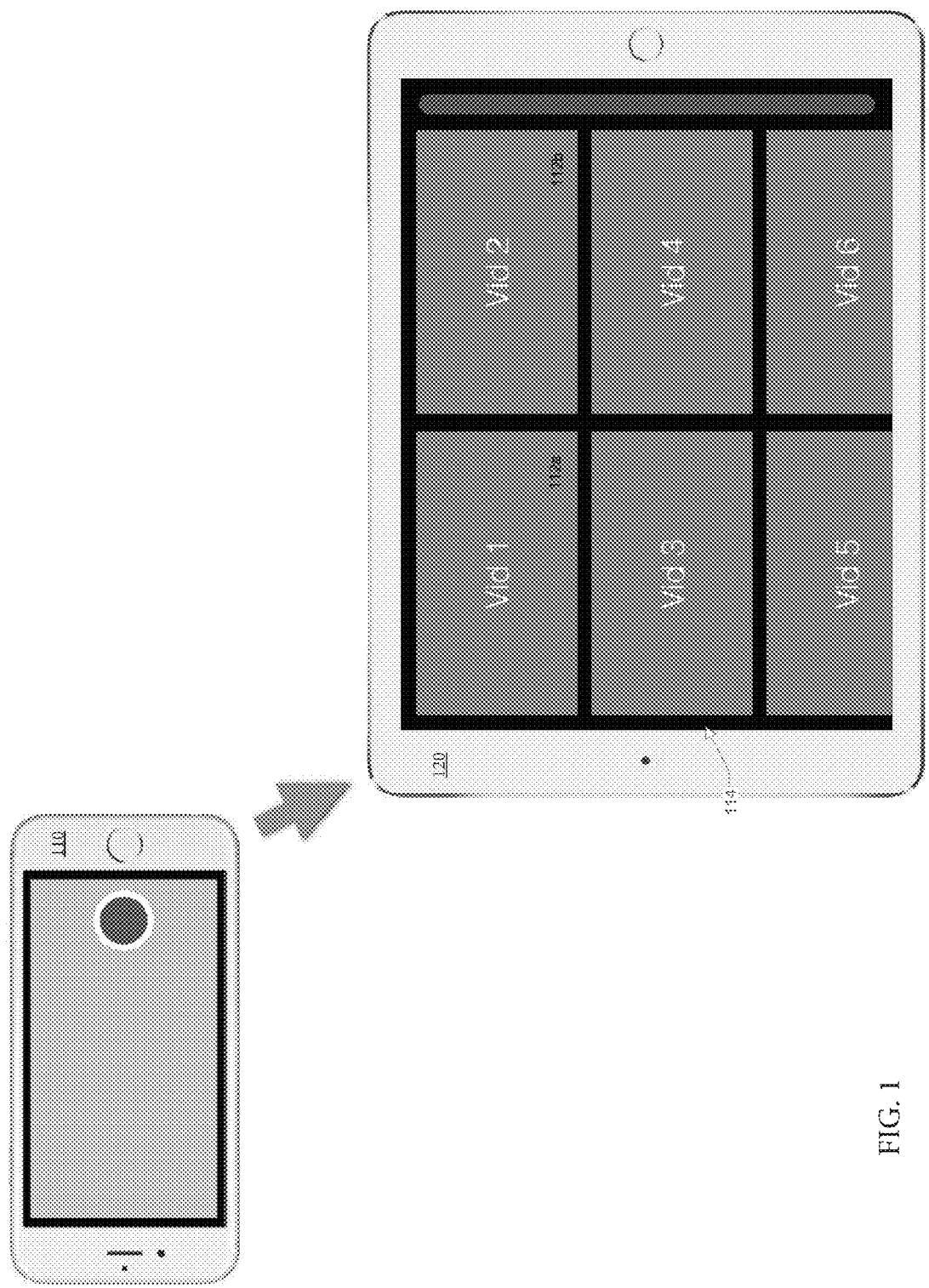
FIG. 1 illustrates sample screenshots of a user interface from camera device and a display device in accordance with the teachings presented herein.

As illustrated in FIG. 1, a camera device 110 (e.g., mobile phone, tablet computer, digital camera, etc.) with a camera is used to record a video segment. The video segment may be stored on the camera device 110 or transmitted via a network connection (e.g., WiFi™, LTE™, or any other appropriate network) with an identification code associated with a desired display device 120. A copy of the video segment is subsequently received by and exhibited on a display device 120 via a network connection. The display device 120 may be any system capable of receiving video from a network and exhibiting it on a display screen 114. In the illustrated example, a tablet computer is shown. The display screen 114 of the display device 120 may be divided into subscreens 112*a*, 112*b* allowing multiple videos to be exhibited simultaneously.

Figure 2:
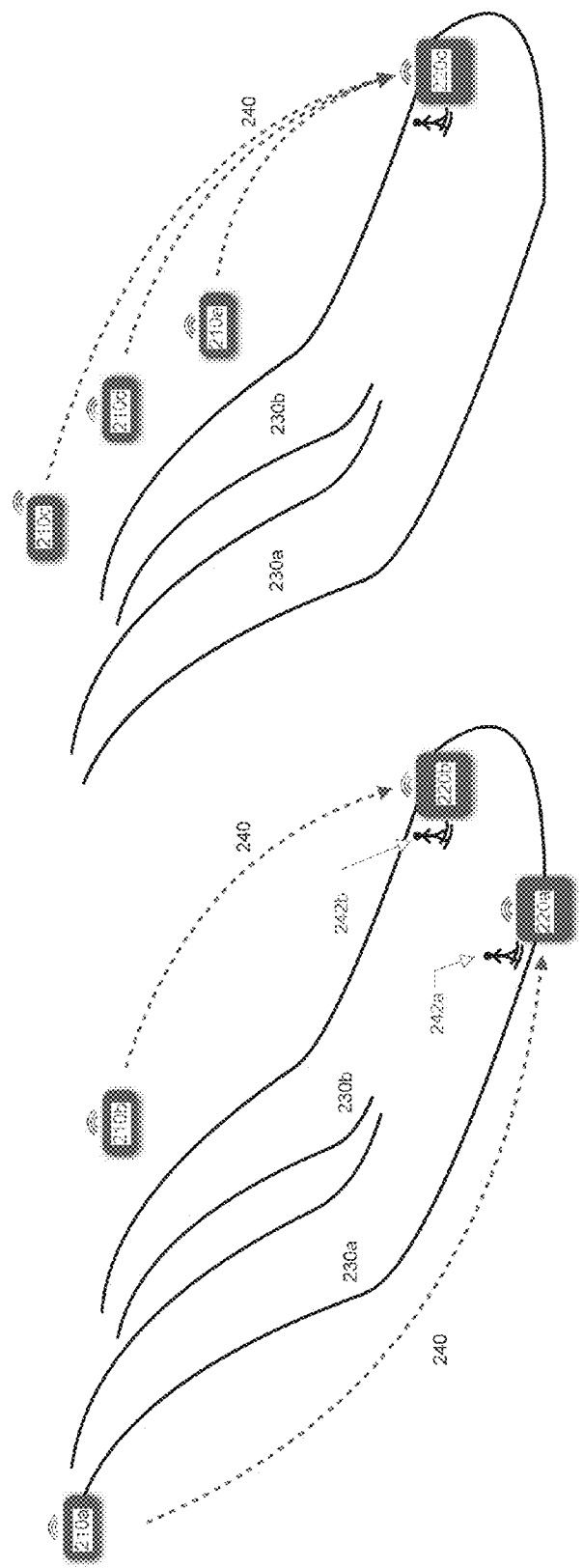
FIG. 2 illustrates a schematic arrangement of the present invention as it may be used on a ski jumping slope.

Turning to FIG. 2, a first athlete 242*a* may be recorded on a video by a first camera device 210*a* while at a first training location 230*a*. The video may be exhibited on a first display device 220*a*. Similarly, a second athlete 242*b* may be recorded on a video by a second camera device 210*b* while at a second training location 230*b*, the video of which may be displayed on a second display device 220*b*. The videos may be transmitted from the camera devices 210*a*, 210*b* to the display devices 220*a*, 220*b* over a network 240.

It should be appreciated that the present invention allows a user to quickly reconfigure a camera device 210*a* to stop transmitting video segments to a first display device 220*a* and instead transmit video segments to a second display device 220*b*. Such reconfiguration may be accomplished by simply inputting or selecting an alternate identification code which is associated with the second display device 220*b*. This may be advantageous for a coach wishing to, using a single camera device 210*a*, record a first video and transmit the first video to a display device 220*a* near a first athlete 242*a* and subsequently record a second video and transmit the second video to a second display device 220*b* near a second athlete 242*b*. Such a scenario may arise when a ski jumping coach is located between adjacent ski jumps (e.g., training locations 230*a* and 230*b*) and it is inconvenient or impractical for a single display device 220*a* to be utilized but rather it is preferred to locate a first display device 220*a* near a first ski jump landing and a second display device 220*b* near a second ski jump landing.

Also, a plurality of camera devices 210*c*, 210*d*, 210*e* may be associated with a single display device 220*c*. In this regard, each of the camera devices 210*c*, 210*d*, 210*e* may transmit video over a network 240 to the single display device 220*c* such that each video is mapped to a subscreen (e.g., subscreens 112*a*, 112*b* of FIG. 1) and exhibited simultaneously. This may allow an athlete 242 to observe a plurality of videos at the same time, each with a different perspective.

Figure 3:
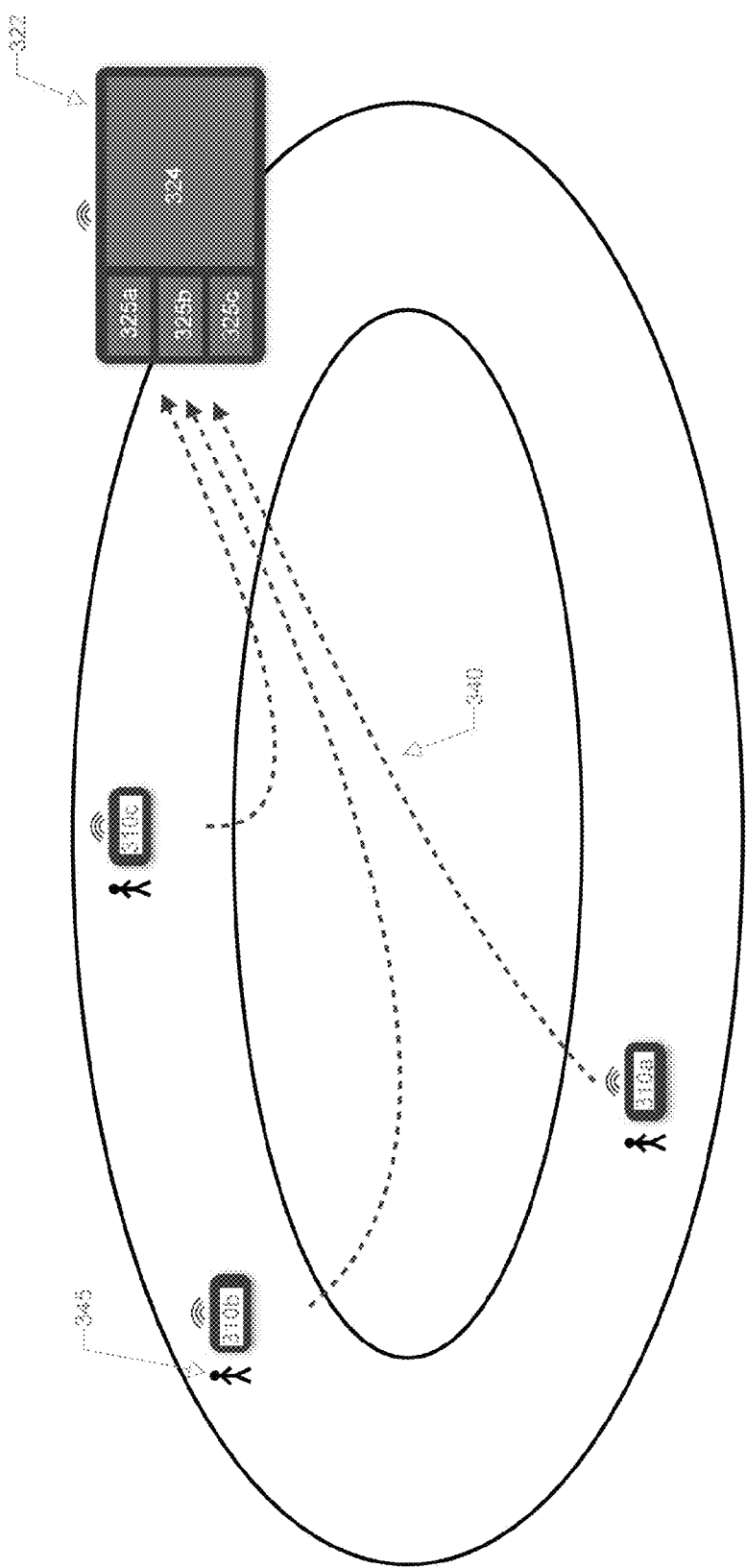
FIG. 3 illustrates a schematic arrangement of the present invention as it may be used in an arena with a scoreboard-type display.

Turning to FIG. 3, the present invention may be implemented in an arena environment. A spectator 345 may attend an event (e.g., a ski jumping competition) at a particular venue (e.g., ski resort). The spectator's camera device 310*b* (e.g., mobile phone) equipped with an application of the present invention may utilize the camera device's 310*b* GPS functionality to identify that the camera device 310*b* is located at that particular venue. As a function of the location, the application may reference a lookup table to ascertain that the nearest public display device 322 is a scoreboard, JumboTron™, or similar device located at the particular venue. As a function of identifying the camera device's location and its proximity to the public display device 322, the application may select the public display device 322 and associate the camera device 310*b* therewith. Alternatively, the spectator 345 may input an identification code associated with the public display device 322. As a result, video segments recorded by the camera device 310*b* are transmitted to the display device 322 via a network 340. Similarly, other camera devices 310*a*, 310*c* may also be associated with the public display device 322 by an identification code. Videos transmitted via the network 340 are mapped to subscreens 324, 325 of the display device 322. In the illustrated example, a primary video feed may be mapped to a primary subscreen 324 while spectators' video feeds are mapped to secondary subscreens 325*a*, 325*b*, 325*c*.

Figure 4:
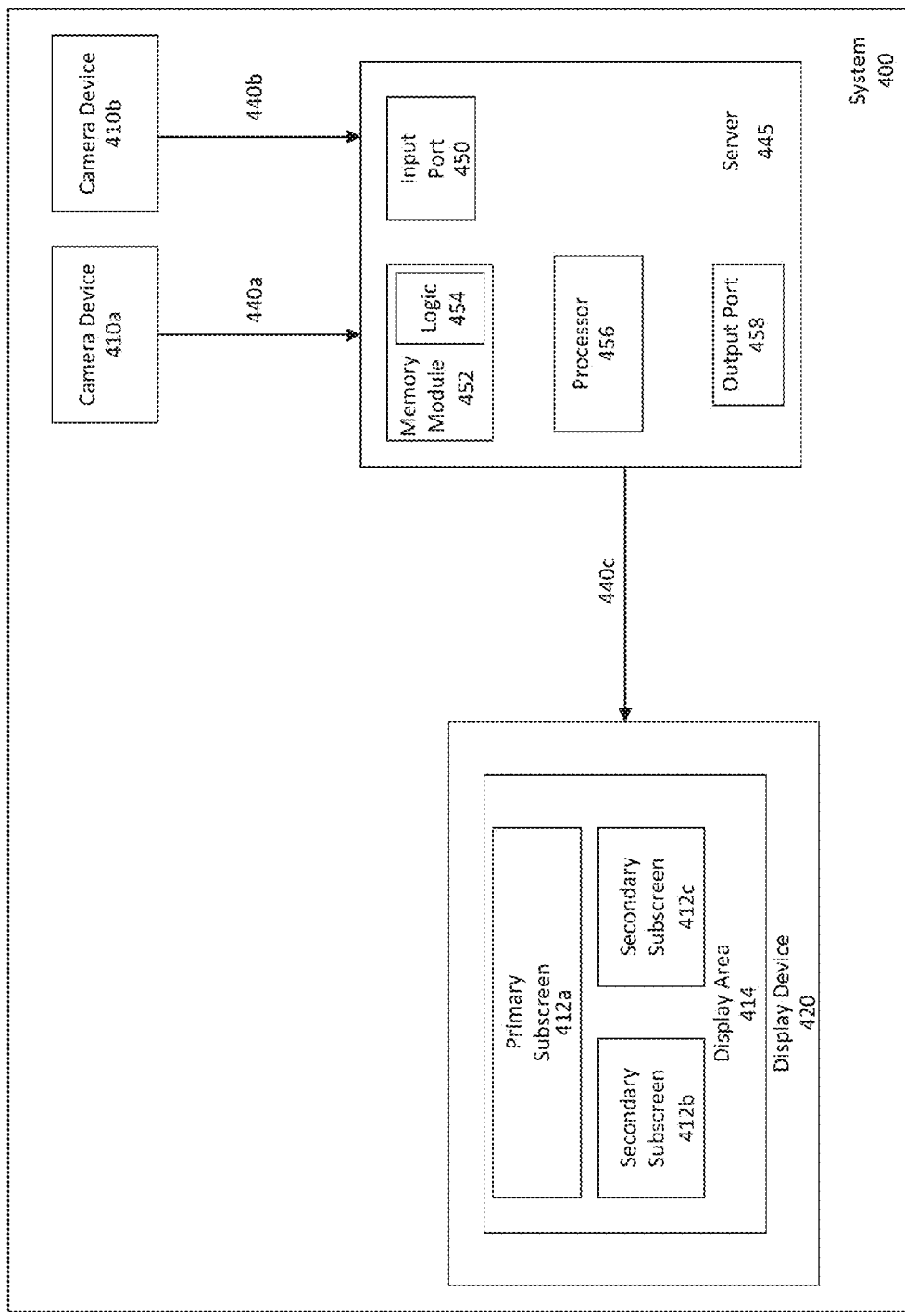
FIG. 4 is a block diagram illustrating video feeds from multiple camera devices being routed through a server to a single display device.

Turning to FIG. 4, a system 400 of the present invention is illustrated. A display device 420 is comprised of a display area 414. The display area 414 may be apportioned into a plurality of subscreens 412. The subscreens may be of equal area or there may be one or more primary subscreens 412*a* which occupy a larger area of the display area 414 than one or more secondary subscreens 412*b*, 412*c*. In one example, there may be a single primary subscreen 412*a* which occupies approximately 50% of the display screen's area 414, wherein the primary subscreen 412*a* displays the most recently received video segment, and two secondary subscreens 412*b*, 412*c* may each occupy approximately 25% of the display screen's area 414, wherein each of the secondary subscreens 412*b*, 412*c* display other video segments.

In another example, a first camera device may be designated as a primary camera device 410*a*. A second camera device may be designated as a secondary camera device 410*b*. The respective designations may be transmitted with the video segments recorded by each camera device 410 or may be assigned by a server 445. Video segments sourced from the primary camera device 410*a* may be displayed on a primary subscreen 412*a* and video segments sourced from a secondary camera device 410*b* may be displayed on a secondary subscreen 412*b*. It should be appreciated that multiple camera devices 410 may also be designated as secondary camera devices 410*b* such that all video segments sourced from secondary camera devices are displayed on one or more secondary subscreens.

A number of video segments may be displayed on the display device 420 simultaneously through mapping to a plurality of subscreens 412. A user may interact with the display device 420 via a user interface to alter the allocation of the display area 414 and arrangement of the video segments. For instance, a user may contact (e.g., using a touchscreen, mouse and pointer, etc.) a particular subscreen 412 causing the video segment on that subscreen to then occupy the entire area of the display screen 414. Alternately, selection of a particular subscreen may cause that particular subscreen to enlarge slightly, thereby reducing the areas of other subscreens. Moreover, a user may drag certain video segments and drop them in other locations on the display area 414 to suit the user's viewing preferences. For example, a user may desire to view a first video segment side by side with a second video segment for comparison.

Importantly, although the illustrated example comprises two camera devices 410a, 410b, any number of camera devices may be used. For instance, a single camera device may be used. In this manner, each of subsequent video segments transmitted over the network 440 may be routed to a subscreen 412. Alternatively, the display area 414 may not be divided into subscreens 412. In this manner, as a new video segment is received, it may be displayed on the display device 420 and a previous video segment ceases to be displayed.

The server 445 of the system 400 is operable to receive, process, queue, or compile video segment data from at least one camera device 410. Data from a camera device is received by the server 445 at an input port 450. Logic 454 for processing the video segment data is stored on a memory module 452. A processor 456 applies the logic 454 to the video segment data. The logic 454 may contain rules for queueing a plurality of video segments such that one video segment begins playing when another video segment ceases playing. Additionally, the logic 454 may contain rules for mapping video segments received from a plurality of camera devices 410a, 410b, or multiple video segments received from a single camera device, to a single display device 420. These rules may include algorithms for allocating the display area 414 into subscreens 412 and mapping video segments to each subscreen 412 based on priority information. The compiled video feed comprising multiple video segments may be transmitted over a network 440c through an output port 458 to a display device 420 for exhibition. Notably, networks 440a, 440b, 440c may all be the same network or may be different networks.

Importantly, the server 445 of the system 400 need not be an independent unit but may be integrated with a camera device or display device. For example, a smart television or tablet computer may be provided as a display device 420 which comprises a server as described herein. Notably, the network connection 440c may not be required as the output port 458 may be in direct communication with the display device to stream video.

Figure 5:
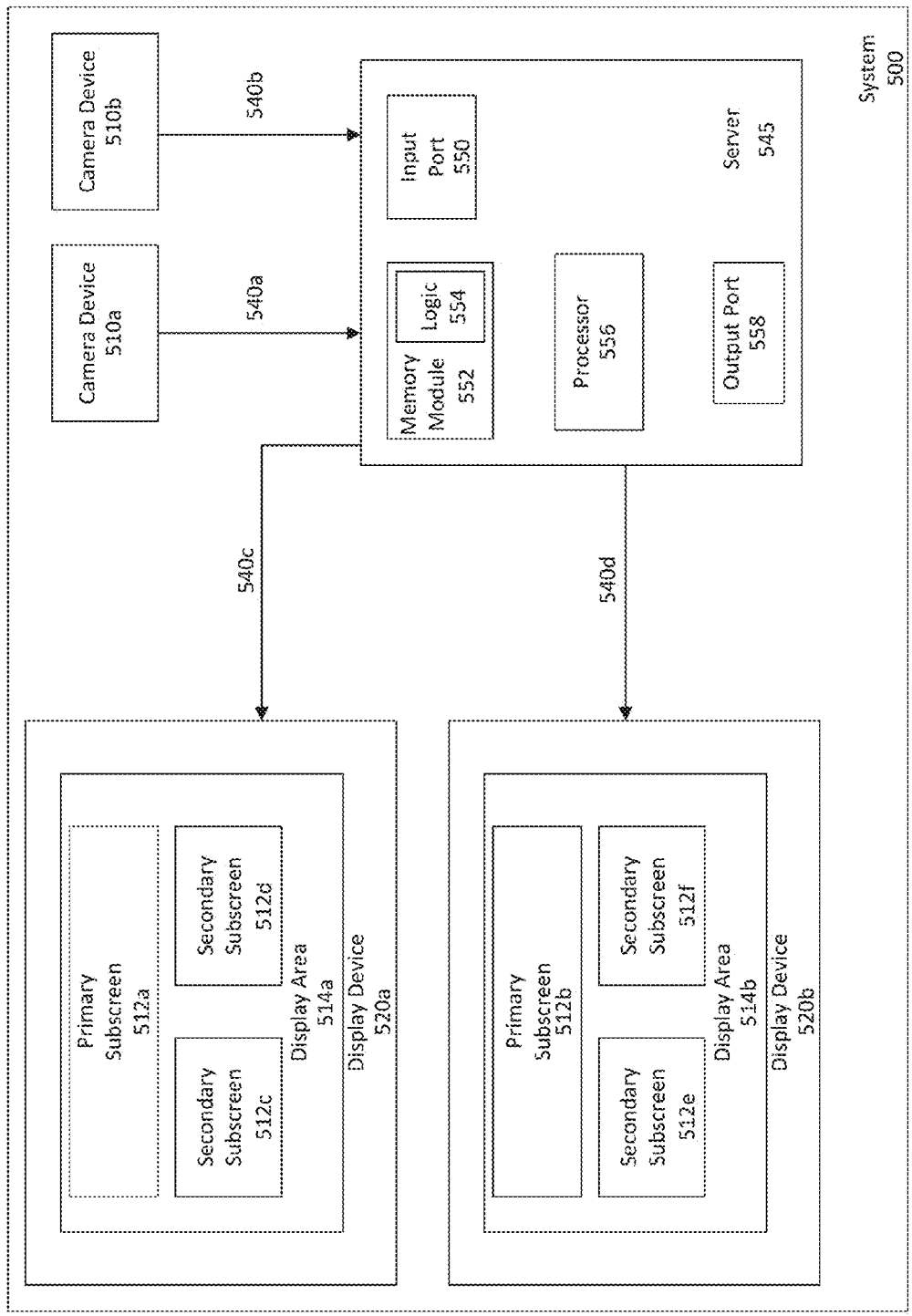
FIG. 5 is a block diagram illustrating video feeds from multiple camera devices being routed through a server to multiple display devices.

The system 500 of FIG. 5 resembles the system 400 of FIG. 4 but with a plurality of display devices 520a, 520b. The server 545 of system 500 may be disposed at a location remote from the camera devices 510a, 510b and/or the display devices 520a, 520b. Camera device 510a may be disposed at a different location than camera device 510b. Similarly, display device 520a may be disposed at a different location than display device 520b. For example, camera device 510a and display device 520a may be disposed at a first event at a first location while camera device 510b and display device 520b may be disposed at a second event at a second location. Video segment data from the camera devices 510a, 510b may be sent over network connections 540a, 540b which may be of the same or different networks. The video segment data comprises identification codes associated with the intended recipient display devices 520a, 520b. For example, video segment data from camera device 510a may include an identification code associated with display device 520a. In this regard, the data is received at server 545 and routed to display device 520a via network 540c. Contemporaneously, video segment data from camera device 510b may be received at server 545 and routed to display device 520b. Thus, the sever 545 is operable to receive data traffic from a plurality of camera devices at one or more input ports (e.g., input port 550), process the data using logic 554 stored in a memory module 552, and transmit the data via an output port 558 to a plurality of display devices 520a, 520b.

Figure 6:
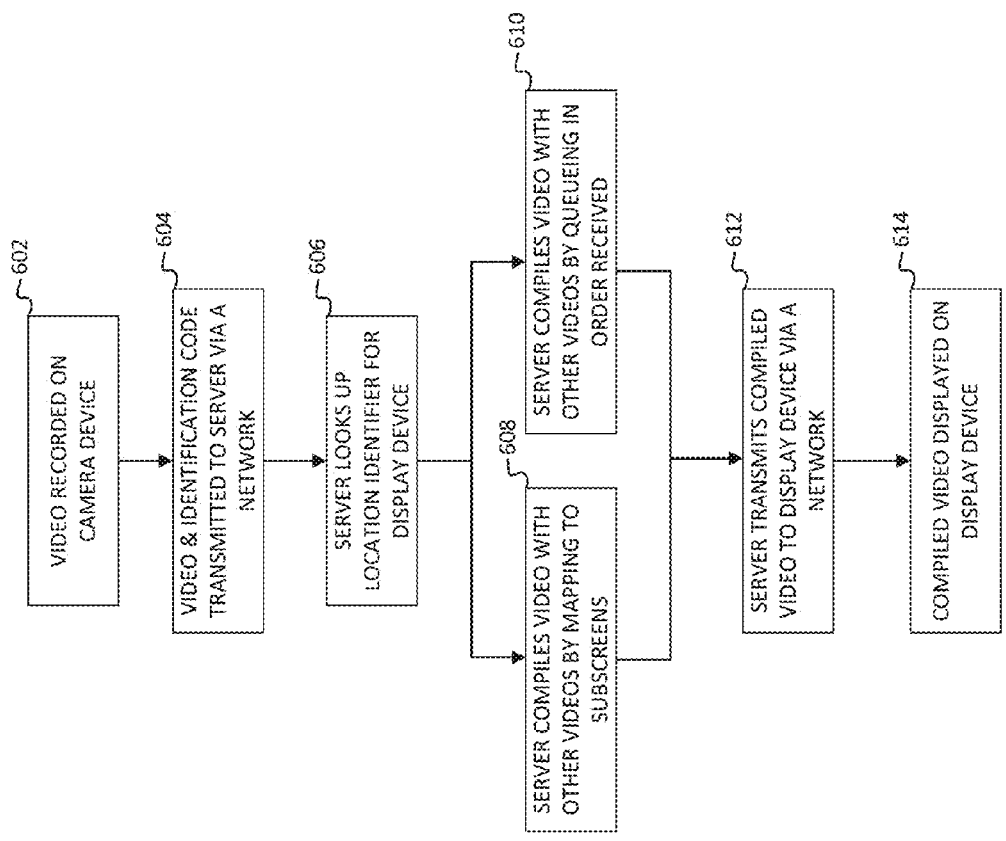
FIG. 6 is a block diagram illustrating the transmission and compilation of video feeds.

FIG. 6 illustrates a method according to the present invention. Video segments may be recorded on any number of camera devices 602. The video segment data from each camera device may be transmitted over a network with an identification code to a server 604. The server may recognize the identification code associated with each video segment and lookup the location identifiers (e.g., IP address) associated with the display devices identified by each identification code 606. The server is operable to transmit each video segment to the identified display device 612. A server may also receive a plurality of video segments with the same identification code, indicating that each of the video segments is associated with a particular display device, and compile the video segments into a composite video feed wherein the composite video feed comprises each video segment allocated to a particular subscreen on the display device 608. Alternately or in conjunction therewith, a server may receive a number of video segments with the same identification code and compile the video segments into a composite video feed wherein the composite video feed comprises each video segment queued in an order corresponding to the order in which they were received or some other measure of priority 610. The video feed from a server is received by a display device and exhibited thereupon 614. It should be appreciated that a camera device or display device may comprise an internal system capable of compiling multiple video segments into a composite video feed, thus eliminating the need for an external server. Alternatively, multiple video segments need not be compiled into a composite video feed but may be transmitted and/or displayed individually, one at a time. In this regard, steps 608 and 610 of FIG. 6 may be optional. Moreover, a camera device and a display device may be in direct communication thereby eliminating the need for an external server to be used.

Figure 7:
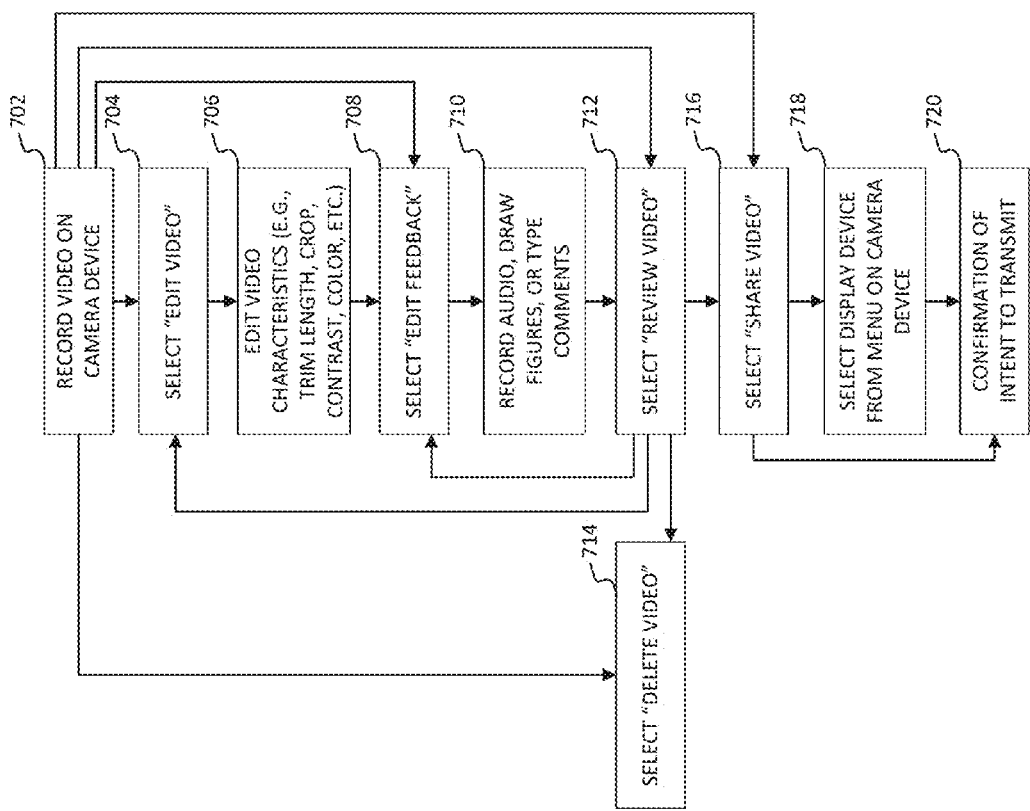
FIG. 7 is a flowchart of a method of preparing a video according to an embodiment of the present invention

FIG. 7 illustrates a flowchart of a method of preparing a video according to an embodiment of the present invention. A video may be recorded on a camera device 702. A menu of selectable options may be presented to a user such that a user my select a desired step. For instance, a user may choose to select an "edit video" option should the user desire to edit the video 704. Selection of the "edit video" option may result in an editing menu being presented to the user. A user may be able to trim the length of the video clip (e.g., deleting the initial portion of the recording which may not contain useful content), crop the frame of the video (e.g., zoom in), or adjust color, contrast, etc. 706. Additionally or alternatively, a user may select an "edit feedback" option 708. Such a selection may result in the display of a menu with specified editing options. For example, a user may be able to record audio commentary to accompany the video, draw shapes, figures, or other animation to be overlaid upon the video when displayed, or may type comments to be overlaid upon the video or otherwise displayed in conjunction with the video 710. After editing (or in some instances without any editing), a user may select "review video" option which may begin playback of the video including any video edits or feedback edits previously made 712. Such review may result in the user returning to video editing 706 or feedback editing 710. Review of the video may also result in the user choosing to delete the video 714 or share the video 716. Notably, a user may also be presented with the options to save or discard changes following any of steps 704-712. At any point at which a user finds a video to be acceptable for distribution, such user may select share video 716. A display device may be selected in any appropriate manner such as selection from a menu on the camera device 718. As discussed above, a display device may also be selected in any other manner such as proximity, a shared network connection, RFID, barcode, etc. Prior to transmission of a video to a server or a display device, a user may be asked to confirm that the user desires to transmit the video 720. For example, a message may be displayed asking "Are you sure you want to submit?" and a user may be presented with the options of "Yes" and "No." Selection of "Yes" may result in transmission of the video, associated feedback, and an identification code. On the other hand, selection of "No" may return a user to a previous step for further editing, input, or deletion. The illustrated method is for exemplary purposes only. It should be appreciated that each of the individual steps may be optional and may be omitted in certain implementations of such method. Additionally, although certain chronological ordering is implied by the illustration, the steps may be reordered or reorganized in any manner which accomplishes the functionality described herein. For example, selection of a display device from a menu on a camera device 718 may occur before a video is recorded on the camera device 702.

Figure 8:
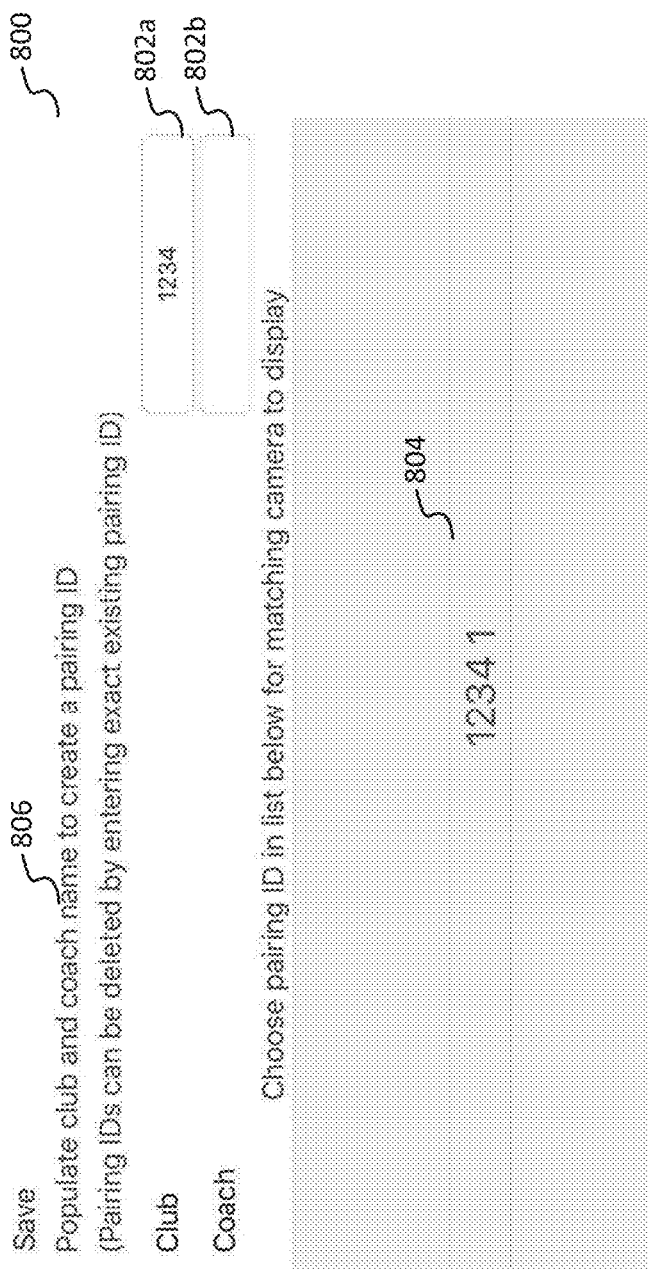
FIG. 8 is an example of a menu for selection of an identification code to pair devices.

FIG. 8 is an example of a menu for selection of an identification code to pair devices. Menu 800 provides a set of instructions 806 for pairing a camera device to a display device. In the illustrated example, a user may enter a club identification value into field 802*a* and a coach identification value into field 802*b*. The combination of these two values may be displayed in list 804. List 804 may display previously entered values or may be auto-populated with a plurality of options available to the user. Rather than manually entering values into fields 802*a* and 802*b*, a user may select an option from list 804. The combination of the club identification value and coach identification value may itself be an identification code for pairing camera devices to a display device. Alternatively, the application may look-up an identification code in a table as a function of the club identification code and coach identification code which have been entered or selected.

Figure 9:
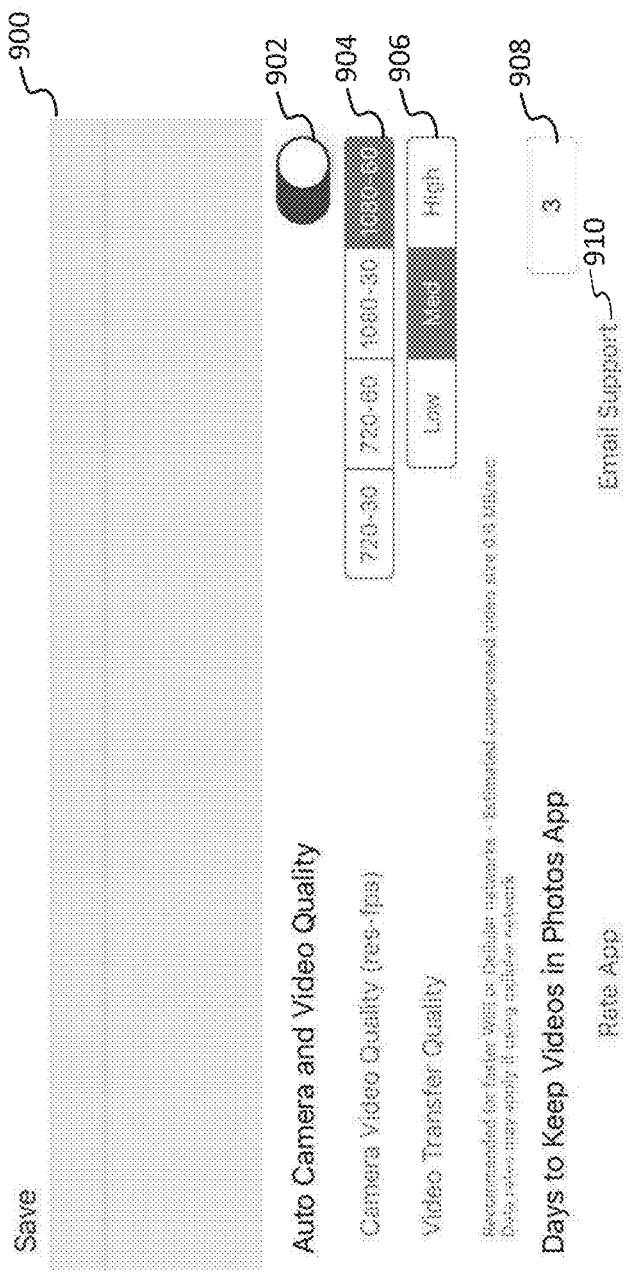
FIG. 9 is an example of a settings menu for a camera device which may be incorporated into an embodiment of the present invention.

FIG. 9 is an example of a settings menu 900 for a camera device which may be incorporated into an embodiment of the present invention. The menu 900 may provide a toggle switch 902 for selectively displaying camera video quality options 904 and video transfer quality options 906. A user may toggle these options 904 and 906 to suit personal preferences which may be dependent upon video quality desired, storage space available, network data limitations, etc. Field 908 may allow a user to select a period of time during which the camera device will store videos in memory before deleting. Similarly, field 908 may be configured to select a period of time for storing videos on a display device which receives videos from the camera device. In this regard, videos may be automatically deleted upon termination of the time period entered into field 908. Additional links or options may be provided in menu 900 such as the email support link 910 shown. Selection of this link 910 may cause the device to access a form within the application for submitting questions to a technical support group. Alternatively, selection of this link 910 may cause the device to access an independent email communication application on the device (e.g., Gmail, Outlook, etc.).

Figure 10:
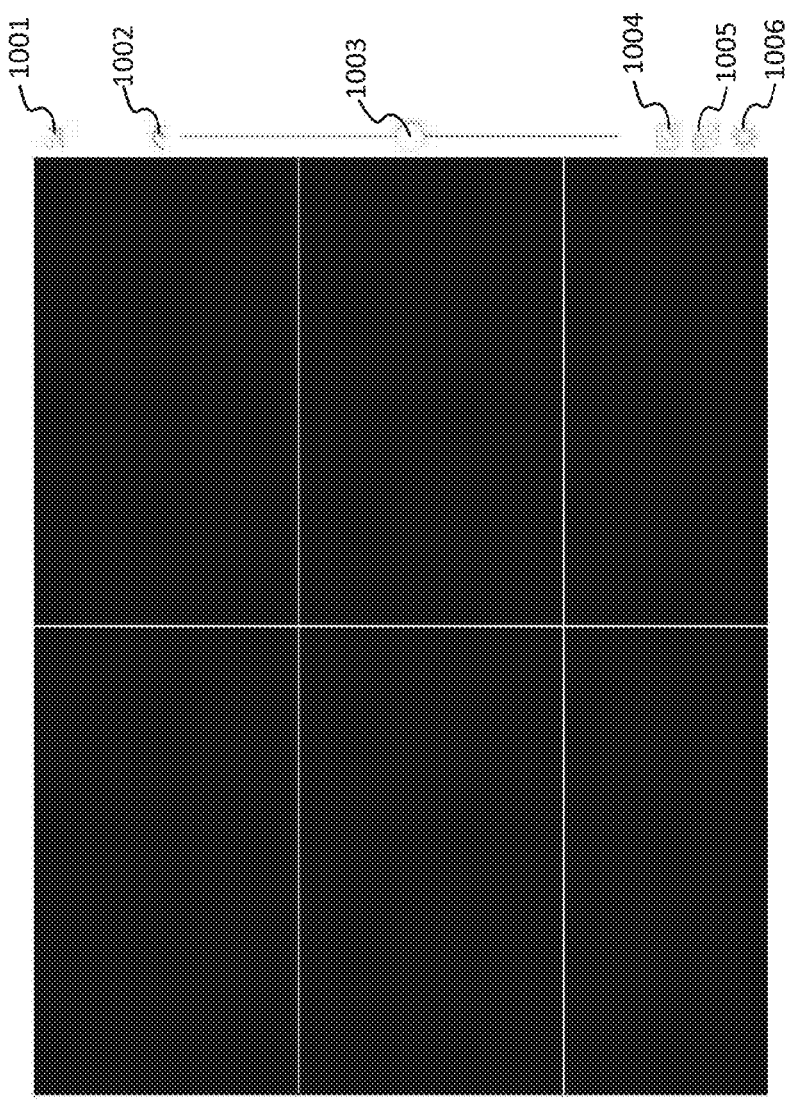
FIG. 10 is a screenshot of an application according to the present invention.

FIG. 10 is a screenshot of an application according to the present invention. Notably, the illustrated embodiment of an application according to the present invention may be operable on a camera device, on a display device, or on both. The screenshot illustrates the division of a display screen into a plurality of subscreens, in this instance, six subscreens. The screenshot also illustrates several status indicators and buttons 1001-1006 as may be included in an embodiment. Connection strength indicator 1001 may inform a user of the status of a data connection. For example, if a device is connected to a WiFi network, connection strength indicator 1001 may provide a visual indication of the integrity of the network connection. Playback speed toggle 1002 may allow a user to alternate between various playback speeds. For example, clicking on the playback speed toggle 1002 may cycle through a series of playback speeds ranging from slow-motion to actual speed to accelerated speeds. Repeatedly clicking on the playback speed toggle 1002 may cycle through the various speeds. Alternatively, clicking on the playback speed toggle may cause a menu to be displayed, on which the user may select a desired playback speed. Playback slide 1003 may be configured to provide customizable configuration of any number of settings. For example, playback slide 1003 may allow a user to select from a spectrum of settings pertaining to display brightness, contrast, playback speed, sound volume, duration of recording, etc. Gallery link 1004 may cause the device to access a gallery of videos and/or photos for display on the display screen. The gallery may be an integral feature of the application or may be an independent application native to the device. Camera/display toggle 1005 may be selected by a user to toggle between camera device mode and display device mode. In this regard, a user may click on camera/display toggle 1005 to access recording functionality associated with application. The user may then select the camera/display toggle 1005 to access the playback functionality associated with the application. In this regard, a coach, for example, may record several video segments and then access the playback functionality to review the performance of an athlete or athletes. Alternatively, the camera/display toggle 1005 may enable various devices to be used interchangeably. For example, a tablet computer may be operable as both a camera device and a display device. Depending on the desired functionality at any given time, a user may toggle the device to serve that purpose. Lastly, settings link 1006 may be selected by a user to access a settings menu, for example, menu 900 of FIG. 9.

Figure 11:
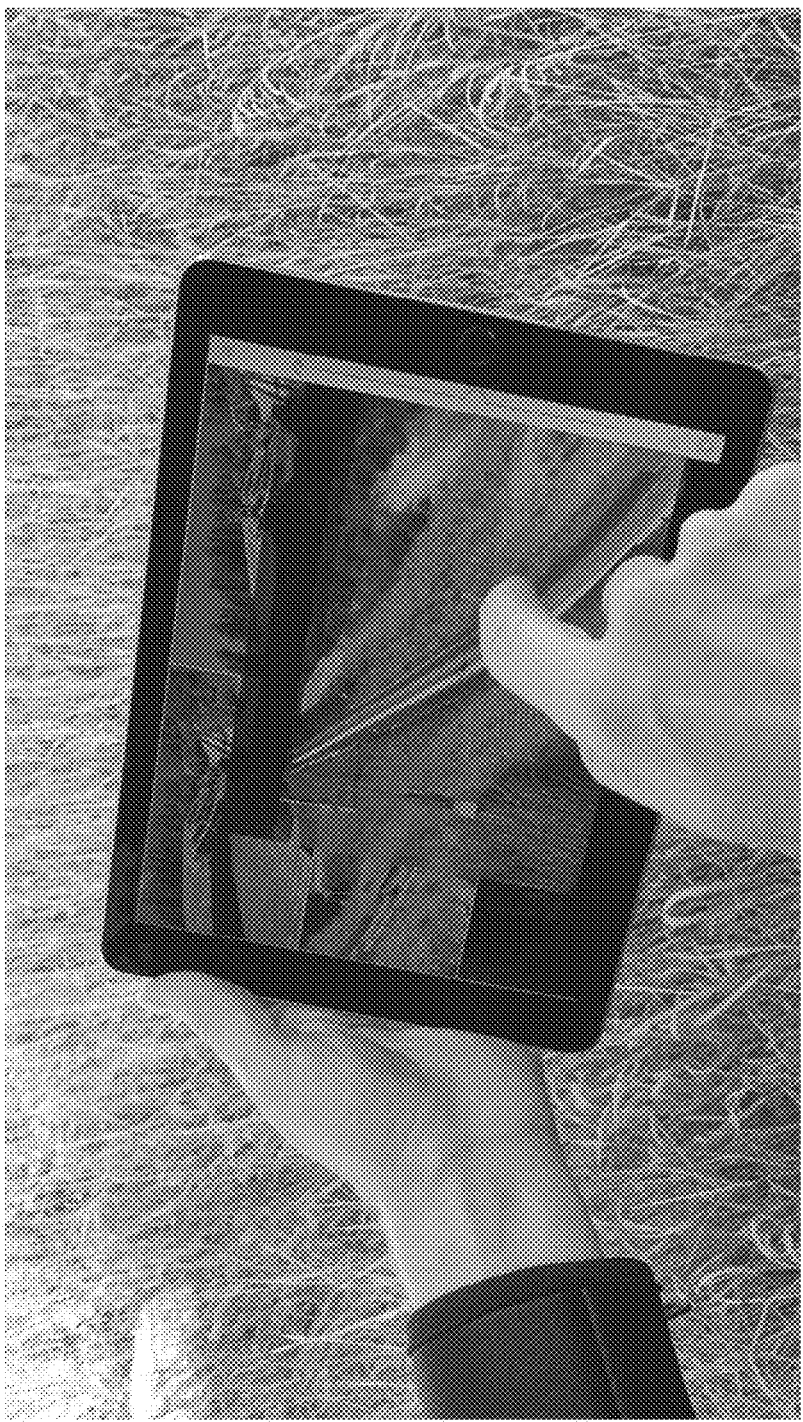
FIG. 11 is an illustration of a user enlarging a subscreen on a display device.

FIG. 11 is an illustration of a user enlarging a subscreen on a display device. As previously discussed, subscreens of a display screen may be enlargeable upon interaction by a user. In the illustrated example, a user may contact a touchscreen device with a finger to cause the video displaying on the contacted subscreen to enlarge. Such enlarged video may return to the original size upon the user removing their finger from the screen. Alternatively, the video may remain enlarged until a subsequent interaction from a user may remain enlarged for a preset period of time. Addtionally, a user may drag a video to another subscreen, thereby replacing the video which was previously being displayed on the subscreen.

Figure 12:
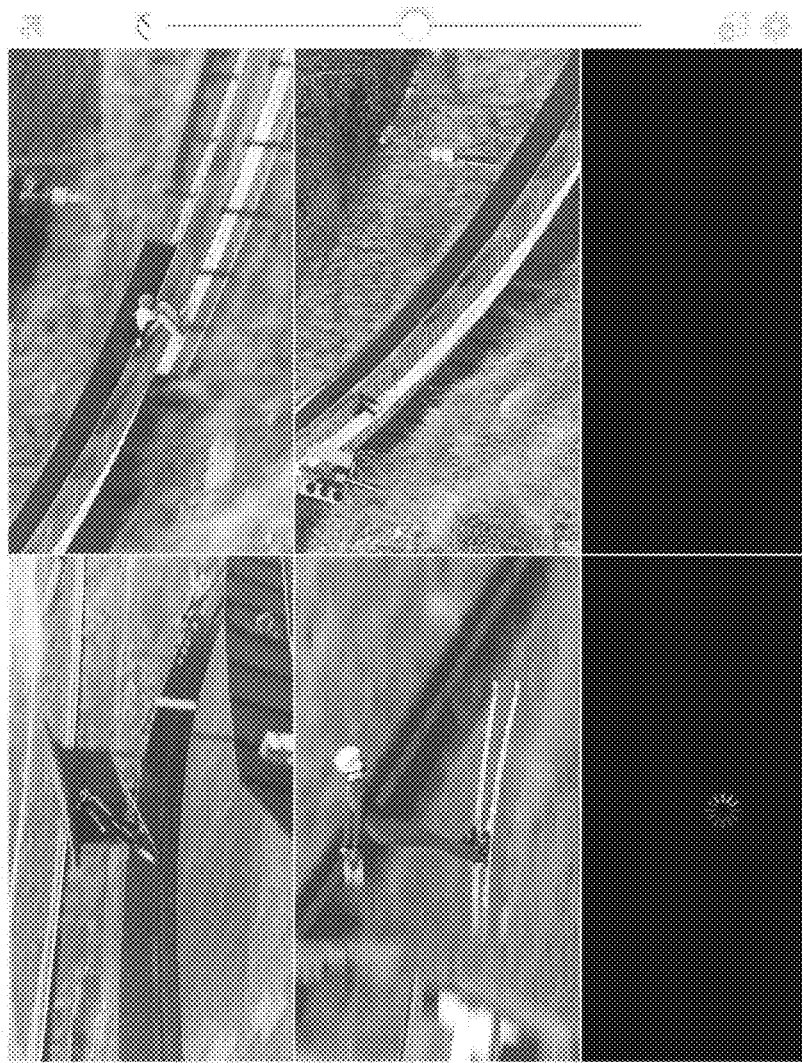
FIG. 12 is an illustration of automated playback features as may be implemented in an embodiment of the present invention.

FIG. 12 is an illustration of automated playback features as may be implemented in an embodiment of the present invention. As previously discussed, video segments may be configured to autoscroll upon their receipt by a display device. In the illustrated example, four video segments have been previously received and are being played on four of the six subscreens. These video segments may be on a playback loop such that upon reaching the termination of the video segment, they each begin replaying from the beginning of the respective video segment. Also, as illustrated, a queueing symbol may be displayed on a previously unoccupied subscreen, thereby providing a visual indication that a video segment has been received by the display device and will soon thereafter begin playback.

There are many alternatives to the specifics discussed herein. For one thing, any of the features shown in any of the discussion provided herein could be incorporated into or combined with any other feature or design discussed herein. As a further example, any of the functionality of any of the described components could be combined with other components or further separated (e.g., method elements may be performed in other sequences, system elements may be combinable with method elements, etc.). While the embodiments of the invention described in the foregoing description are illustrative, they are merely examples and not restrictive in character. For example, although many examples used herein are in relation to ski jumping and athletic events, embodiments of the present invention may be applicable to any number of uses and environments, including but not limited to law enforcement, news reporting, surveillance and security, etc.

What is claimed is:

1. A method for using an athletic training system, comprising:
   providing a video control system for receiving video content from camera devices of one or more authorized users and controlling delivery of said video content on one or more display devices;
   disposing a first display device at a first location adjacent an athletic theatre for use by athletes in reviewing video recordings of the athletes performing athletic activities at the athletic theatre;
   providing an identification code, to a first user of said authorized users, for use in enabling said first user to access said video control system using a first camera device;
   receiving, at said video control system, a network transmission, from said first camera device using said identification code, said network transmission including a first video recording of a first athlete performing a first athletic activity at said athletic theatre, said first video recording being obtained at a second location, different than said first location, adjacent said athletic theatre, said network transmission between said first camera device and said video control system involving at least one wireless network link; and
   routing said network transmission to said first display device as a function of said first identification code.

2. The method of claim 1, further comprising operating said video control system to display said first video recording to said first athlete on said first display device free from any contemporaneous user input.

3. The method of claim 2, further comprising apportioning a display screen of the first display device into at least a first subscreen and a second subscreen, wherein the first subscreen exhibits the first video recording and the second subscreen exhibits the second video recording.

4. The method of claim 3, further comprising displaying an advertisement, wherein the advertisement is displayed on a subscreen of the display screen contemporaneously with the first video recording or the second video recording.

5. The method of claim 1, further comprising interacting, by the first athlete, with a user interface of the first display device to selectively apportion a display screen of the first display device according to preferences of the first athlete.

6. The method of claim 5, wherein:
   the user interface comprises a touchscreen.

7. The method of claim 1, further comprising:
   receiving, at said video control system, a second network transmission, from a second camera device using said identification code, said second network transmission including a second video recording of a second athlete performing a second athletic activity at said athletic theatre, said second video recording being obtained at the second location, said second network transmission between said second camera device and said video control system involving at least one wireless network link; and
   operating said video control system to display said second video recording to said second athlete on said first display device free from any contemporaneous user input by said second athlete.

8. The method of claim 7, wherein:
   the first video recording is displayed on the first display device upon being received by the first display device; and
   the second video recording is displayed on the first display device upon being received by the first display device such that the first video recording ceases to be exhibited upon the first display device.

9. The method of claim 1, further comprising:
   receiving commentary from the first user, said commentary pertaining to content of the first video recording;
   transmitting said commentary to the first display device; and
   exhibiting the commentary simultaneously with the first video recording.

10. A training system for athletes, comprising:
    a first display device for displaying video recordings, wherein said first display device is disposed at a first location adjacent an athletic theatre for use by athletes in reviewing video recordings of the athletes performing athletic activities at the athletic theatre;
    a video control system, operatively associated with said first display device, for receiving, via a wireless network, video recordings of said athletes performing said athletic activities at said athletic theatre from authorized users, and controlling said first display device to display said recordings free from any contemporaneous user inputs at said first display device;
    a first camera device operated by a first authorized user;
    a second camera device operated by a second authorized user; and
    a second display device;
    wherein:
    the first display device is associated with a first identification code and the second display device is associated with a second identification code;

the first identification code is selected on the first camera device;

the first camera device transmits a first video recording with the first identification code;

the second identification code is selected on the second camera device, the second camera device transmits a second recording with the second identification code;

the video control system receives the first video recording with the first identification code and the second video recording with the second identification code and is operable to direct:

the first video recording to the first display device as a function of the first identification code; and the second video recording to the second display device as a function of the second identification code.

11. The system of claim 10, wherein the video control system comprises:

an input port for receiving data from the wireless network, wherein the data comprises the first video recording and the second video recording;

a memory module, wherein the memory module is operable to store a logic program;

a processor, wherein the processor is operable to direct the first video recording to the first display device and the second video recording to the second display device; and an output port, wherein the output port is operable to transmit the first and second video recordings.

12. A training system for athletes, comprising:

a first camera device and a second camera device;

a display device; and a video control system;

wherein:

the display device is disposed at a first location adjacent an athletic theatre for use by athletes in reviewing video recordings of the athletes performing athletic activities at the athletic theatre, is associated with an identification code and comprises a first subscreen and a second subscreen;

the first camera device transmits a first video recording and the identification code;

the second camera device transmits a second video recording and the identification code; and the video control system is operable to:

receive the first video recording, the second video recording, and the identification code;

generate, in response to identifying that the first video recording and the second video recording are routed to the display device as a function of the identification code, a composite video feed, wherein the composite video feed comprises the first video recording mapped to the first subscreen and the second video recording mapped to the second subscreen; and transmit the composite video feed to the display device.

13. The system of claim 12, wherein the video control system comprises:

an input port for receiving data from a network, wherein the data comprises the first video recording and the second video recording;

a memory module, wherein the memory module is operable to store a logic program;

a processor, wherein the processor is operable to generate the composite video feed as a function of the logic program; and an output port, wherein the output port is operable to transmit the composite video feed.

* * * * *